UNITED STATES PATENT OFFICE.

FRANCES L. CRANDALL, OF GREENWICH, NEW YORK.

SALVE.

SPECIFICATION forming part of Letters Patent No. 227,958, dated May 25, 1880.

Application filed April 7, 1880. (No specimens.)

*To all whom it may concern:*

Be it known that I, FRANCES L. CRANDALL, a citizen of the United States, residing at Greenwich, in the county of Washington and State of New York, have invented a new and Improved Salve as a Remedy for Diphtheria and other Purposes; and I do hereby declare that the following is a full, clear, and exact description thereof.

The present invention relates to a new salve especially intended as a remedy for diphtheria and local inflammation, and is composed of the following ingredients mixed together in about the proportions as hereinafter stated, viz: fresh butter, eight ounces; sweet-oil, twenty-four ounces; dried wormwood-leaves, one and a half ounce; gum-mastic, three and a half ounces; gum-myrrh, three and a half ounces; gum-olibanum, three and a half ounces; white lead, (in oil,) thirteen ounces; bees-wax, eight ounces.

In preparing this salve the wormwood is steeped in a small quantity of water, then strained and mixed with the butter and heated until the water is entirely evaporated, and the other ingredients are then added, the gums mastic, myrrh, and olibanum being first powdered.

To use this salve it is spread on linen and applied to the throat or inflamed parts, and changed every three hours in malignant type of diphtheria.

I have found this preparation to be a diphtheria-absorbent salve of great power, and in connection with it I generally use a suitable gargle.

The above-described salve is also beneficial in inflammation of the eyes when applied to the temples and back of the ears, and in inflamed swellings, burns, scalds, &c.

I am aware a plaster of myrrh is mentioned in United States dispensatory as made of powdered myrrh, camphor, and balsam of Peru, with a lead plaster previously melted, and I do not claim such composition.

Having thus described my invention, I claim as new and desire to secure by Letters Patent—

The salve composed of fresh butter, sweet-oil, wormwood, gums mastic, myrrh, and olibanum, with white lead and bees-wax, mixed together in or about the proportions herein set forth.

FRANCES L. CRANDALL.

Witnesses:
JOB G. SHERMAN,
ALICE B. WHEELER.